(12) United States Patent
Douglas et al.

(10) Patent No.: US 11,140,183 B2
(45) Date of Patent: Oct. 5, 2021

(54) DETERMINING CRITICALITY OF IDENTIFIED ENTERPRISE ASSETS USING NETWORK SESSION INFORMATION

(71) Applicant: EMC IP Holding Company LLC, Hopkinton, MA (US)

(72) Inventors: Kevin Douglas, Vienna, VA (US); Diptanu Das, Falls Church, VA (US); Leandro Diato, San Francisco, CA (US); Nicholas Hoang, Chantilly, VA (US); Kien Nguyen, Fairfax, VA (US)

(73) Assignee: EMC IP Holding Company LLC, Hopkington (MA)

( * ) Notice: Subject to any disclaimer, the term of this patent is extended or adjusted under 35 U.S.C. 154(b) by 306 days.

(21) Appl. No.: 16/260,614

(22) Filed: Jan. 29, 2019

(65) Prior Publication Data
US 2020/0244682 A1    Jul. 30, 2020

(51) Int. Cl.
*H04L 29/06*    (2006.01)
*G06F 16/23*    (2019.01)

(52) U.S. Cl.
CPC ...... *H04L 63/1425* (2013.01); *G06F 16/2365* (2019.01); *H04L 63/20* (2013.01)

(58) Field of Classification Search
CPC .. H04L 63/1425; H04L 63/20; G06F 16/2365
See application file for complete search history.

(56) References Cited

U.S. PATENT DOCUMENTS

| 6,088,801 | A | * | 7/2000 | Grecsek | G06F 21/51 |
| | | | | | 726/1 |
| 7,594,270 | B2 | | 9/2009 | Church et al. | |
| 8,931,043 | B2 | * | 1/2015 | Cooper | H04L 63/1441 |
| | | | | | 726/1 |

(Continued)

OTHER PUBLICATIONS

Wikipedia, Nmap, https://en.wikipedia.org/w/index.php?title=Nmap&oldid=879530690, Jan. 21, 2019.

(Continued)

*Primary Examiner* — Oleg Korsak
(74) *Attorney, Agent, or Firm* — Ryan, Mason & Lewis, LLP (57) ABSTRACT

Methods, apparatus, and processor-readable storage media for identifying and determining the criticality of enterprise assets using network traffic information are provided herein. An example computer-implemented method includes capturing network session information from an enterprise network; identifying multiple assets within the enterprise network by processing the captured network session information; determining, for each of the identified assets, one or more predefined features of the asset based at least in part on the processing of the captured network session information; determining, for each of the identified assets, a level of criticality associated with the asset based at least in part on the one or more determined features of the asset; and outputting the level of criticality and an identifier of the asset associated therewith to a security-related system, wherein the level of criticality and the asset identifier are used by the security-related system to take at least one automated action.

20 Claims, 6 Drawing Sheets

(56) References Cited

U.S. PATENT DOCUMENTS

| | | | |
|---|---|---|---|
| 10,185,832 B2 | 1/2019 | Cam | |
| 10,521,442 B1* | 12/2019 | Gatchell | G06Q 40/06 |
| 10,681,060 B2* | 6/2020 | Scheidler | G06F 21/566 |
| 10,721,261 B1* | 7/2020 | Todd | G06F 21/577 |
| 11,075,885 B2* | 7/2021 | Subbarayan | G06F 21/554 |
| 2013/0247207 A1* | 9/2013 | Hugard, IV | H04L 63/1433 |
| | | | 726/25 |
| 2015/0033282 A1* | 1/2015 | O'Hern | H04L 63/10 |
| | | | 726/1 |
| 2017/0099306 A1 | 4/2017 | Chiu et al. | |
| 2018/0048550 A1* | 2/2018 | Beyah | H04L 63/1408 |
| 2018/0145984 A1 | 5/2018 | Duggal et al. | |
| 2019/0089741 A1* | 3/2019 | Hill | H04L 63/0876 |
| 2019/0089742 A1* | 3/2019 | Hill | H04L 41/22 |
| 2019/0222596 A1* | 7/2019 | Abbaszadeh | G06F 21/554 |
| 2019/0297055 A1* | 9/2019 | May | H04L 63/1408 |
| 2020/0043008 A1* | 2/2020 | Hrabik | G06Q 20/3821 |
| 2020/0117177 A1* | 4/2020 | Cantrell | H04L 67/12 |
| 2020/0204576 A1* | 6/2020 | Davis | H04L 63/1425 |

OTHER PUBLICATIONS

Wikipedia, p0f, https://en.wikipedia.org/w/index.php?title=P0f&oldid=787800859, Jun. 27, 2017.

* cited by examiner

```
{
    "ipAddress" : "12.34.56.100",
    "hostName" : "DOUGLAS-PC01",
    "countryCode" : "US",
    "criticalityLevel" : "HIGH",
    "dateFirstSeen" : "2018-01-01 12:00:00",
    "dateLastSeen" : "2018-08-01 14:31:12", "serverApplications" : [
      {
        "applicationName" : "github",
        "dateFirstSeen" : "2018-01-01 12:00:00', "dateLastSeen" : "2018-08-01 14:31:12",
    "criticalityLevel" : "HIGH",
    "connections" : [
       {
          "countryCode" : "US",
          "dateFirstSeen" : "2018-01-01 12:00:00",
          "dateLastSeen" : "2018-08-01 14:31:12",
          "avgConnectionsPerDay" : 1019211,
          "avgSessionBytesPerDay" : 10192110,
          "maxConnectionsPerDay" : 1019211,
          "maxSessionBytesPerDay" : 10192110
       },
       {
          "countryCode" : "RU",
          "dateFirstSeen" : "2018-01-01 12:00:00",
          "dateLastSeen" : "2018-08-01 14:31:12",
          "avgConnectionsPerDay" : 1019211,
          "avgSessionBytesPerDay" : 10192110,
          "maxConnectionsPerDay" : 1019211,
          "maxSessionBytesPerDay" : 10192110
       }
     ]
   },
 {
```

```
"applicationName" : "nginx",
"dateFirstSeen" : "2018-01-01 12:00:00"
"dateLastSeen" : "2018-08-01 14:31:12",
"criticalityLevel" : "MEDIUM",
"connections" : [
    {
        "countryCode" : "US",
        "dateFirstSeen" : "2018-01-01 12:00:00",
        "dateLastSeen" : "2018-08-01 14:31:12",
        "avgConnectionsPerDay" : 1019211,
        "avgSessionBytesPerDay" : 10192110,
        "maxConnectionsPerDay" : 1019211,
        "maxSessionBytesPerDay" : 10192110
    }
  ]
 }
]
}
```

DETERMINING CRITICALITY OF IDENTIFIED ENTERPRISE ASSETS USING NETWORK SESSION INFORMATION

FIELD

The field relates generally to information processing systems, and more particularly to techniques for providing security in such systems.

BACKGROUND

For purposes of analyzing and prioritizing security-related events on an enterprise network, it is important to understand what assets are on the network. Conventional asset determination approaches typically include requesting user-provided network maps or asset lists. However, relying solely on user-provided network maps or asset lists presents problems with inaccurate and outdated information.

SUMMARY

Illustrative embodiments of the disclosure provide techniques for determining criticality of identified enterprise assets using network session information. An exemplary computer-implemented method includes capturing network session information from an enterprise network and identifying multiple assets within the enterprise network by processing the captured network session information. Such a method also includes determining, for each of the identified assets, one or more predefined features of the asset based at least in part on the processing of the captured network session information, as well as determining, for each of the identified assets, a level of criticality associated with the asset based at least in part on the one or more determined features of the asset. Further, such a method additionally includes outputting the level of criticality and an identifier of the asset associated therewith to one or more security-related systems, wherein the level of criticality and the asset identifier are used by the one or more security-related systems to take at least one automated action.

Illustrative embodiments can provide significant advantages relative to conventional asset determination approaches. For example, challenges associated with inaccurate and outdated information are overcome through leveraging network traffic information to dynamically determine a level of criticality for assets identified on the enterprise network.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
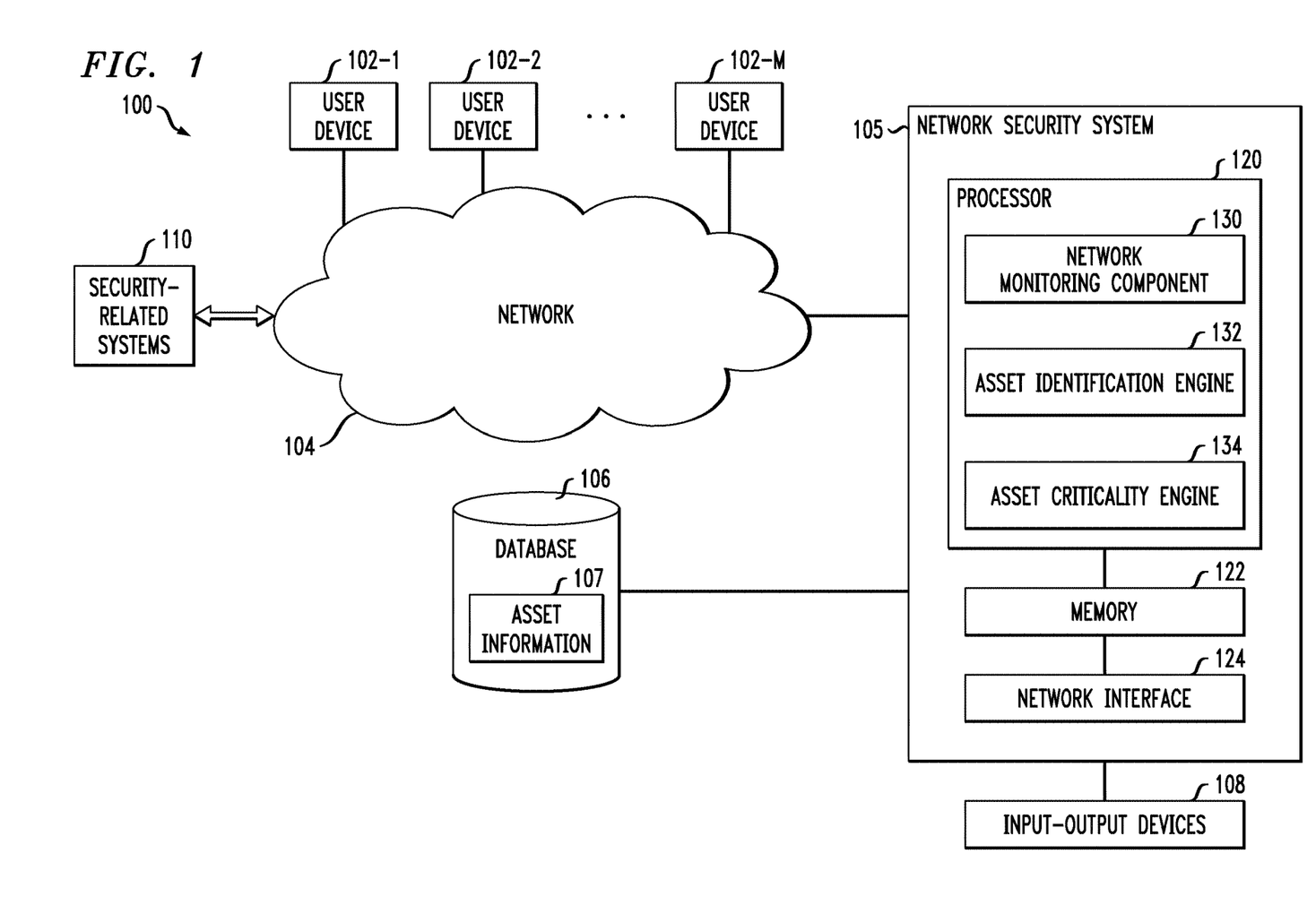
FIG. 1 shows an information processing system configured for determining criticality of identified enterprise assets using network session information in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is network security system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the network security system 105 can have an associated database 106 configured to store data 107 pertaining to information associated with assets within the given network, as further detailed herein.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the network security system 105 are input-output devices 108, which illustratively comprise keyboards, displays or other types of input-output devices in any combination. Such input-output devices can be used, for example, to support one or more user interfaces to the network security system 105, as well as to support communication between the network security system 105 and other related systems and devices not explicitly shown.

In the present embodiment, asset criticality information generated by the network security system 105 are provided over the network 104 to one or more security-related systems 110. Such systems, like the user devices 102, can illustratively comprise mobile telephones, laptop computers, tablet computers, desktop computers, or other types of computers or processing devices configured for communication over network 104 with the network security system 105. For example, a given security-related system can comprise a computing device equipped with an application configured to receive asset criticality information from the network security system 105 and to provide an interface for a security agent to select particular remedial measures or actions for responding to the asset criticality information.

It should be noted that a "security agent," as the term is generally used herein may comprise, for example, an automated entity, such as a hardware, software or firmware entity running on a processing device. Accordingly, like the above-noted "user," a security agent may but need not comprise a human entity.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102 and the security-related systems 110, and illustratively comprises one or more conventional transceivers.

The processor 120 further comprises a network monitoring component 130, an asset identification engine 132 and an asset criticality engine 134.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the network monitoring component 130, asset identification engine 132 and asset criticality engine 134 may be implemented at least in part in the form of software that is stored in memory 122 and executed by processor 120.

It is to be understood that the particular set of elements shown in FIG. 1 for determining criticality of identified enterprise assets using network session information involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing network monitoring component 130, asset identification engine 132 and asset criticality engine 134 of an example network security system 105 in computer network 100 will be described in more detail with reference to the flow diagram of FIG. 4.

Accordingly, at least one embodiment of the invention includes implementation of an asset identification technique which passively identifies network assets by determining which applications are active on machines on the network. Once a list of active applications has been identified, the role (also referred to herein as the asset criticality) of that machine can be derived. As such, such an embodiment dynamically identifies network assets independent of a user-supplied network map or asset inventory, and determines each asset's level of importance from a security perspective. The generated asset criticality information can then be used to prioritize security-related events and/or take one or more automated actions by a security-related system.

By way of further example, one or more embodiments include passively identifying network assets by analyzing multiple layers of a protocol stack. Such an embodiment can include identifying each machine's operating system (OS) using techniques which fingerprint known patterns within the Transmission Control Protocol (TCP) and Internet Protocol (IP) header fields. For hypertext transfer protocol (HTTP) applications, at least one embodiment includes identifying Web servers using techniques which fingerprint the existence and sequencing of HTTP REQUEST and RESPONSE headers. Further, such an embodiment includes identifying RESTful applications using techniques to fingerprint network application layer behavior.

Once the OS and a list of active applications have been identified for a machine, the role and criticality of that machine can be derived. By way of example, if a revision control system is running on a given network machine, the machine's role is most likely a source code repository, and the machine is likely a critical asset. Further, knowing that a security-related event involves a source code repository allows the event's priority to be raised to a more critical level. Alternatively, knowing that a security-related event does not involve any crucial assets allows the priority level to be lowered.

Figure 2:
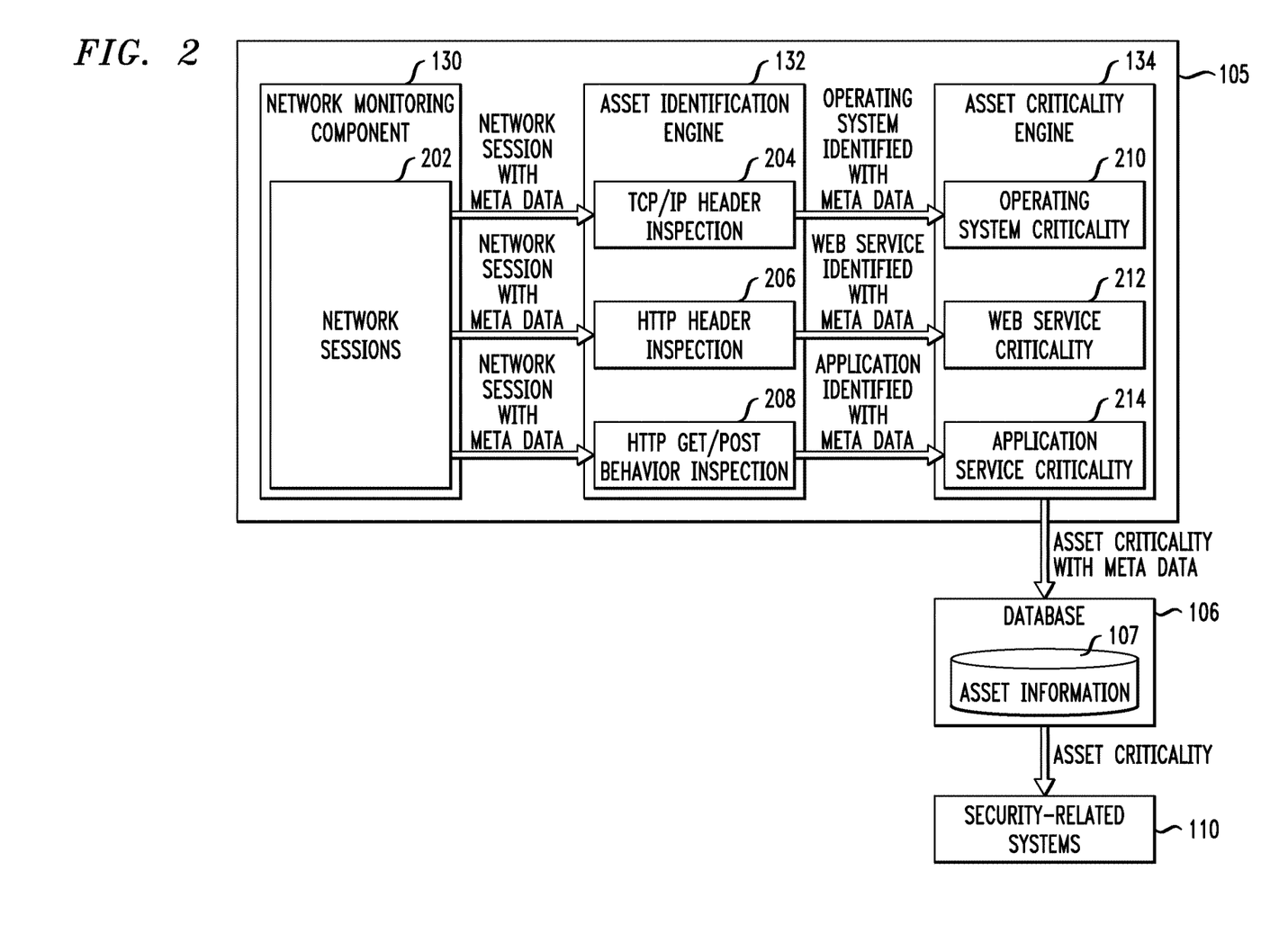
FIG. 2 shows example system architecture in an illustrative embodiment.

FIG. 2 shows example system architecture in an illustrative embodiment. By way of illustration, FIG. 2 depicts network security system 105, database 106, and security-related systems 110. More specifically, the network monitoring component 130 captures and reassembles all network sessions 202 (along with related metadata) for inspection by the asset identification engine 132. The asset identification engine 132 is responsible for inspecting the network, transport and application layers in order to identify the operating system, web service and application(s) for each network session. Once identified, the asset criticality engine 134, using components 210, 212, and 214, will assign a level of criticality for the asset based on user-defined levels for each OS, web service and application, respectively. These asset criticality assessments are then recorded in database 106 (for example, in sub-database 107) for security-event prioritization within the security-related systems 110 (such as security analytics systems).

As noted above, the network monitoring component 130 is responsible for network session 202 capture. As also noted above, these network sessions are provided to the asset identification engine 132 for processing, wherein the asset identification engine 132 is responsible for identifying the asset within each network session (for example, IP addresses involved). For each asset in the network session, identification will be made to determine the OS, web service and application(s) involved. The resulting identifications are then provided to the asset criticality engine 134 for processing, wherein the asset criticality engine 134 assigns a criticality level for the asset involved, based on user-configurable levels for each OS, web service and application identified. Database 106, also referred to herein as a critical asset inventory, is a knowledge store of each discovered asset on the network, along with its criticality level, OS identification, web service identification, and list of known active applications.

More specifically, network monitoring component 130 carries out network packet capture and network session reassembly. In addition to the reassembled network session, additional session metadata are captured and can include, for example, geographic information for source and destination IP address, session packet count information, and the number of session bytes.

In order to passively identify assets on the network, at least one embodiment provides a full packet capture of network sessions involving the assets to be identified. The asset identification engine 132 performs a deep inspection of specific packets within the session, along with a deep inspection of behavioral aspects of the session. In such an embodiment, it is the role of the network monitoring component 130 to ensure that packet-level detail, the reassembled session, as well as session level metadata can be provided to the asset identification engine 132.

As detailed above, the asset identification engine 132 is responsible for analyzing the network, transport and application layers of the protocol stack to identify the OS, web server and application(s) for the assets involved. As part of this analysis, the asset identification engine 132 utilizes a TCP/IP header inspection component 204, an HTTP header inspection component 206, and an HTTP GET/POST behavior inspection component 208. With respect to the TCP/IP header inspection component 204, each OS provides its own implementation of the TCP/IP network stack, such that it conforms to applicable Requests for Comments (RFCs). In one or more embodiments, implementations of TCP must conform to the specifications as outlined in RFC 793. Similarly, in such embodiments, implementations of Internet Protocol version 4 (IPv4) must conform to the specifications as outlined in RFC 791. The applicable RFCs do not mandate all aspects of the specification, allowing the implementer to decide how to do so. As an example, the TCP Options field allows for zero or more optional attributes to be set (e.g., Maximum Segment Size, etc.). The ordering of these optional fields is not specified by the RFC. This allows each provider to choose their own ordering within their implementation of TCP. Additional examples include the initial Time to Live (TTL) value within the IP Header, and the Window Size field within the TCP Header.

To identify the OS for each asset within a network session, the asset identification engine 132 matches the various TCP and IP header fields against a database of known signature values. These signatures describe how each OS vendor has chosen to implement the non-mandated aspects of TCP/IP. By matching actual TCP/IP header values against this signature set, the OS of each session asset can be identified.

With respect to the HTTP header inspection component 206, each web server must provide an implementation of the HTTP protocol, as described by RFC 2616. This RFC specifies numerous Request and Response header fields (e.g., Content-Type, Last-Modified, etc.), but does not mandate their presence within HTTP sessions, nor does it mandate the sequence of these fields, if present. This lack of enforcement allows each web server to differ in its implementation.

To identify the web server for each web session, the asset identification engine 132 analyzes the presence and sequence of HTTP Request and Response header fields against a database of known signatures. The signatures describe how each vendor chose to include or exclude the header fields, and, if included, describe the sequencing of the fields within the session. By matching actual HTTP header inclusion and sequencing against the signature set, the web server for the HTTP session can be identified.

With respect to the HTTP behavior inspection component 208, identifying that a network service is using the HTTP protocol does not clearly identify the specific role of the machine. This is because, over time, more and more server applications have been implemented via RESTful application programming interfaces (APIs) using the HTTP protocol. To identify the underlying application, the HTTP session must be examined to identify application-specific behavior. For example, consider a Revision Control System which supports transfer protocols implemented over HTTP. Each new user of a repository typically starts by cloning the repository locally. When the user wants to save local revisions, he or she push their changes back to the network repository. These predictable user behaviors map to predictable HTTP GET/POST behavior patterns that can be identified within the network session.

To identify the specific application for a given HTTP session, the asset identification engine 132 analyzes HTTP GET/POST behavior against a database of known behavioral patterns. Such patterns describe how each HTTP application behaves under known and anticipated scenarios. By matching the actual behavior against the behavioral pattern database, the application can be identified.

As also depicted in FIG. 2, the asset criticality engine 134 is an engine that allows pluggable modules to be activated. Each of these modules is responsible for processing the network sessions and related metadata in order to determine the level of importance of the asset being analyzed. Once determined, the asset criticality and associated metadata are provided to database 106 (or sub-database 107). Additionally, as illustrated, the asset criticality engine 134 is comprised of an operating system criticality component 210, a web service criticality component 212, and an application service criticality component 214. Also, in one or more embodiments, in addition to components 210, 212, and 214, additional pluggable criticality modules can be deployed to augment and/or influence the prioritization of each asset.

The operating system criticality component 210, based on the OS identified for each of the assets being analyzed, references a user-configurable table, which maps operating systems to a corresponding level of criticality. The web service criticality component 212, based on the web service identified for the network session being analyzed, references a user-configurable table, which maps web services to a corresponding level of criticality. Additionally, the application service criticality component 214, based on the service application (e.g., an email server) identified for the network session being analyzed, references a user-configurable table, which maps applications to a corresponding level of criticality.

The database 106, as noted above, is a knowledge store containing each of the passively identified enterprise assets, along with its assigned level of criticality and associated metadata (e.g., geographic IP information, date/time for first and last seen instances, the number of session bytes, etc.). These assets are recorded with a unique identifier (a host name, an IP address, etc.) in order to allow retrieval of the asset and criticality information for security event prioritization and correlation. In at least one embodiment, the knowledge store is front-ended with a query capability to allow security-related systems 110 to query and correlate the criticality of assets involved in a security event to the event itself. This correlation provides the security-related systems 110 with the ability to raise or lower the event priority based on the criticality of the assets involved.

By way of example, the security-related systems 110 can represent external analysis carried out via analytics involving enterprise machines that query database 106 using a unique identifier (e.g., a host name or an IP address) in order to learn the criticality of certain assets. If the criticality level of a machine is "high," the priority of the related security event can be adjusted accordingly. For example, knowing that a security breach involved a critical asset (e.g., a source code repository, email servers, etc.) provides a valuable insight into the level of priority associated with a potential attack.

Figure 3:
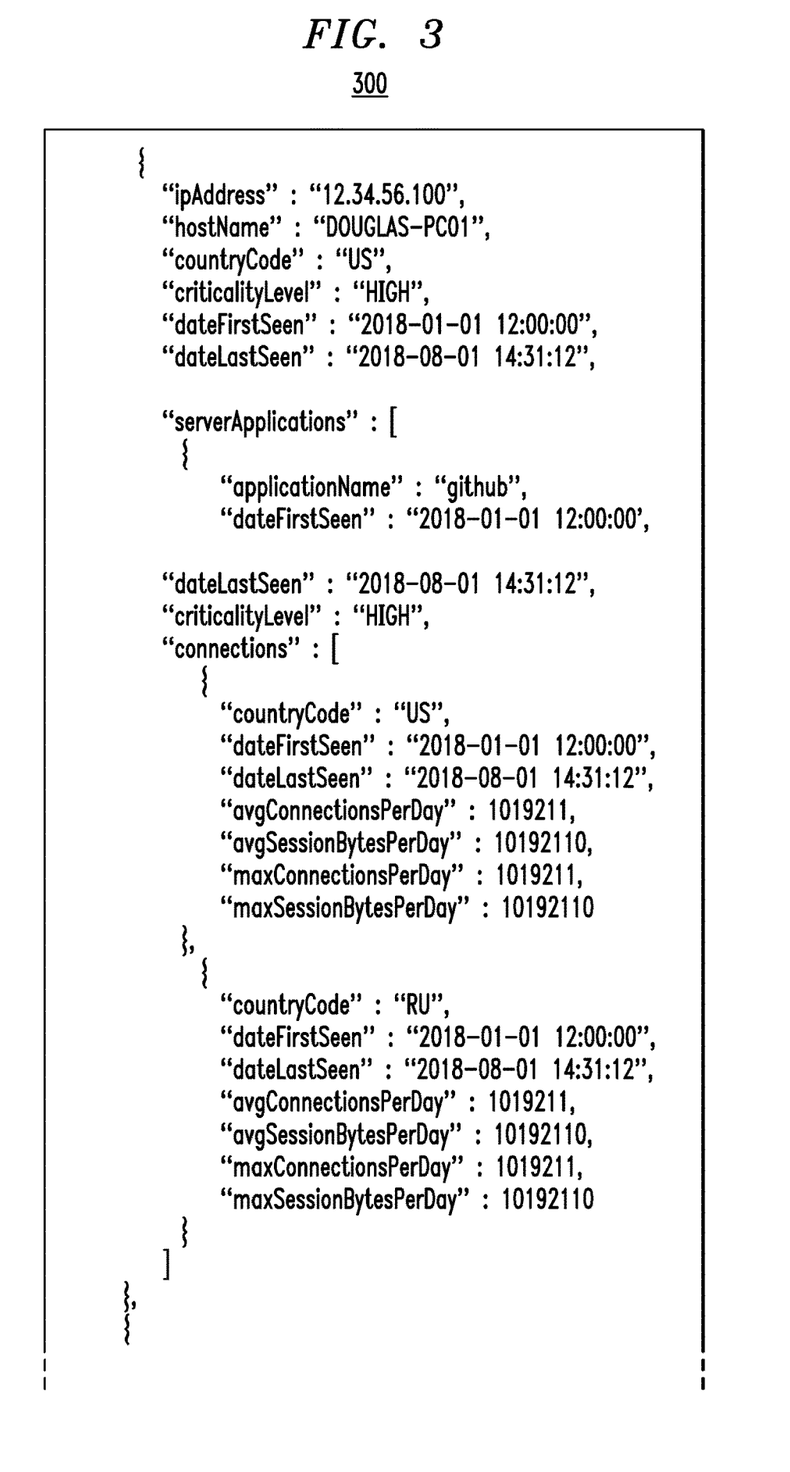
FIG. 3 shows an example of attributes recorded for each of multiple passively identified assets in an illustrative embodiment.

In addition to the criticality level, one or more additional attributes can be recorded to database 106, such as depicted in FIG. 3.

FIG. 3 shows an example of attributes recorded for each of multiple passively identified assets in an illustrative embodiment. In this embodiment, pseudocode 300 is executed by or under the control of a system, such as network security system 105, or another type of processing system.

The pseudocode 300 illustrates example of attributes associated with the assets being passively identified. Such attributes provide an inventory of the various server applications discovered on each asset, along with an inventory of each network connection made to or from that server application. By understanding the types of services available on a given asset, along with the frequency of use, geographies involved, and volume of data being transmitted, the criticality of the asset can be determined (as further detailed herein in accordance with one or more embodiments).

It is to be appreciated that this particular pseudocode shows just one example implementation of attributes recorded for each of multiple passively identified assets, and alternative implementations of the process can be used in other embodiments.

Figure 4:
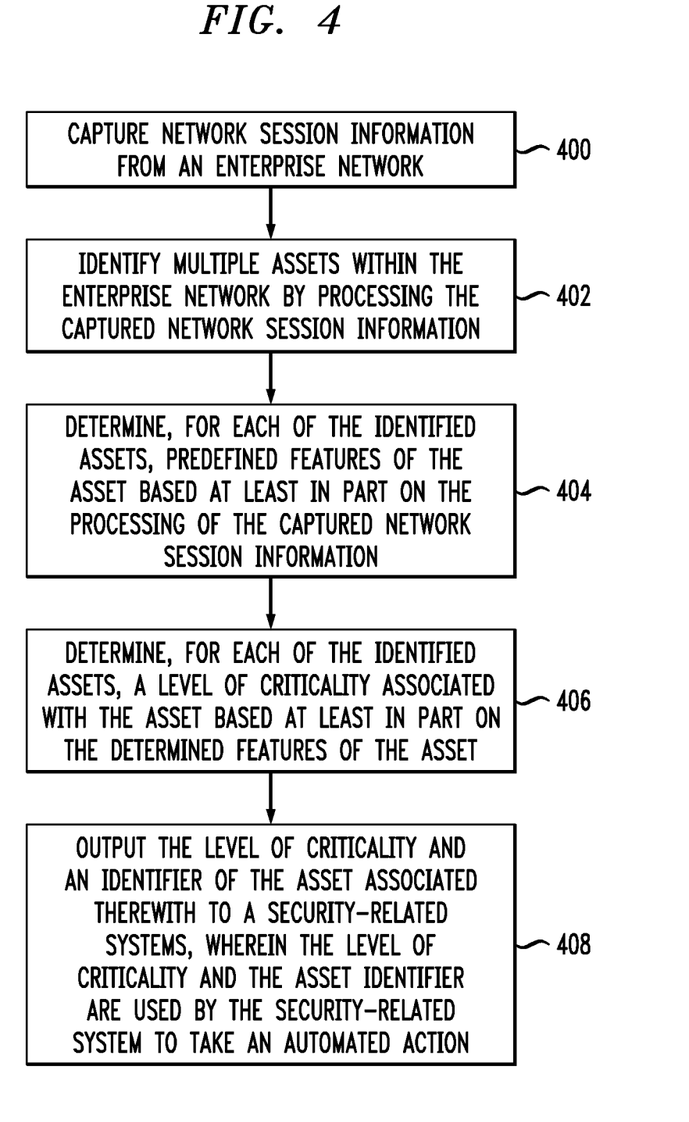
FIG. 4 is a flow diagram of a process for determining criticality of identified enterprise assets using network session information in an illustrative embodiment.

FIG. 4 is a flow diagram of a process for determining criticality of identified enterprise assets using network session information in an illustrative embodiment. It is to be understood that this particular process is only an example, and additional or alternative processes can be carried out in other embodiments.

In this embodiment, the process includes steps 400 through 408. These steps are assumed to be performed by the processor 120 utilizing its modules 130, 132 and 134.

Step 400 includes capturing network session information from an enterprise network. Step 402 includes identifying multiple assets within the enterprise network by processing the captured network session information. Identifying the multiple assets within the enterprise network can include identifying multiple internet protocol (IP) addresses within the captured network session information.

Step 404 includes determining, for each of the identified assets, one or more predefined features of the asset based at least in part on the processing of the captured network session information. The one or more predefined features can include an operating system of the asset, a web service used by the asset, and/or an application used by the asset. Additionally, determining the one or more predefined features of the asset can include processing transmission control protocol header information attributed to the asset, processing internet protocol header information attributed to the asset, processing hypertext transfer protocol header information attributed to the asset, and/or processing one or more hypertext transfer protocol request behavior patterns attributed to the asset.

Step 406 includes determining, for each of the identified assets, a level of criticality associated with the asset based at least in part on the one or more determined features of the asset. Determining the level of criticality associated with the asset can include utilizing user-defined levels of criticality associated with each of the one or more predefined features.

Step 408 includes outputting the level of criticality and an identifier of the asset associated therewith to one or more security-related systems, wherein the level of criticality and the asset identifier are used by the one or more security-related systems to take at least one automated action. Additionally, at least one embodiment also includes recording, for each of the identified assets, the level of criticality, the one or more determined features, and the asset identifier associated therewith to at least one database associated with one or more security analytics systems.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to dynamically identify network assets independent of a user-supplied network map or asset inventory. These and other embodiments can additionally leverage such information to determine the level of criticality for each asset, which can then be used to prioritize security-related actions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of a computer system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
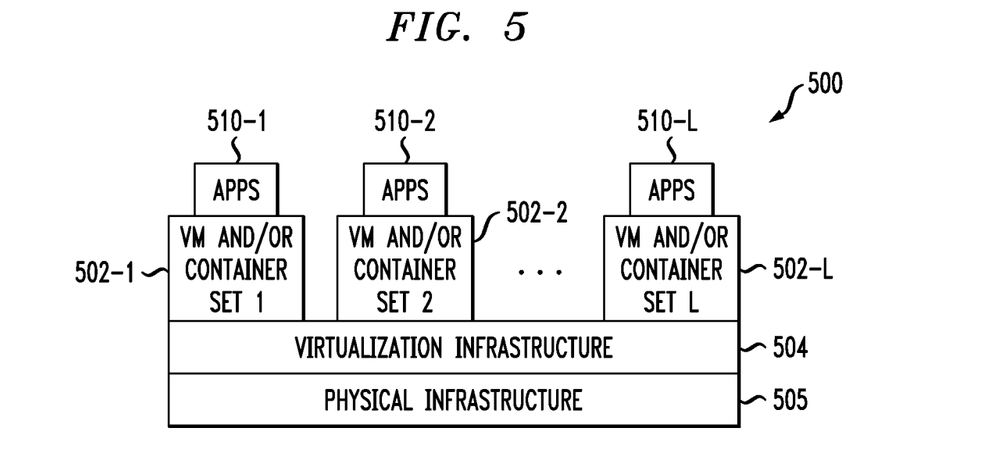
FIGS. 5 and 6 show examples of processing platforms that may be utilized to implement at least a portion of an information processing system in illustrative embodiments.
Figure 6:
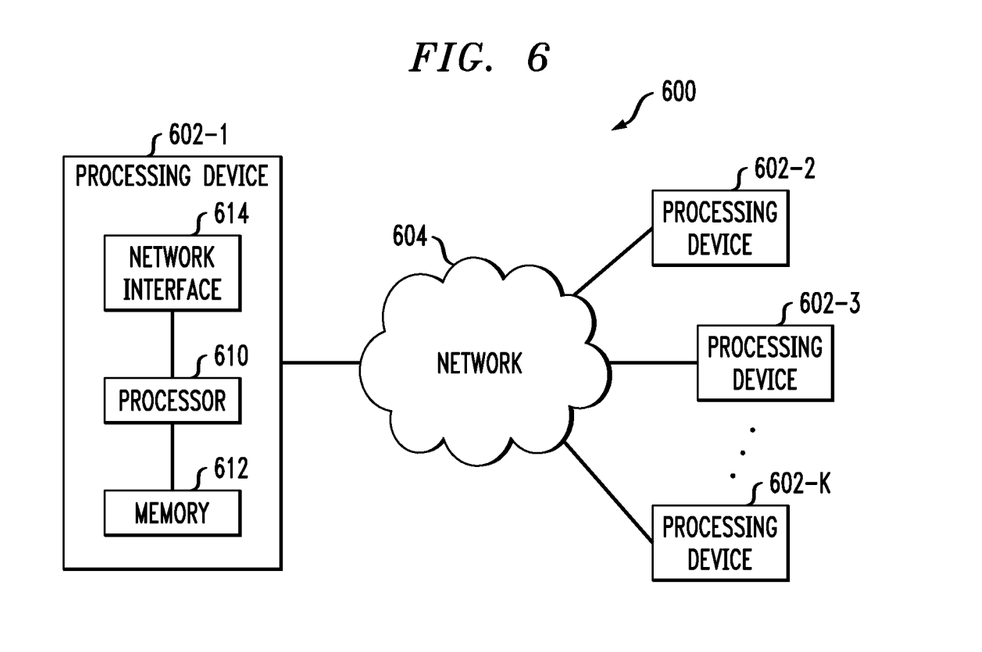

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

An example of a hypervisor platform used to implement a hypervisor within the virtualization infrastructure 504 is the VMware® vSphere® which has an associated virtual infrastructure management system such as the VMware® vCenter™. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
capturing network session information from an enterprise network;
identifying multiple assets within the enterprise network by processing the captured network session information;
determining, for each of the identified assets, one or more predefined features of the asset based at least in part on the processing of the captured network session information, wherein determining one or more predefined features comprises, for each of the identified assets:
identifying an operating system running on the given identified asset by processing pattern data within one or more transmission control protocol header fields and one or more internet protocol header fields;
identifying one or more applications running on the given identified asset by processing sequencing data pertaining to one or more hypertext transfer protocol request headers and one or more hypertext transfer protocol response headers, wherein identifying one or more applications running on the given identified asset comprises identifying one or more representational state transfer applications by processing network application layer behavior data;
determining, for each of the identified assets, a level of criticality associated with the asset based at least in part on the one or more determined features of the asset, wherein determining the level of criticality associated with the asset comprises utilizing user-defined levels of criticality associated with each of the identified operating systems and each of the identified applications; and
outputting the level of criticality and an identifier of the asset associated therewith to one or more security-related systems, wherein the level of criticality and the asset identifier are used by the one or more security-related systems to take at least one automated action;
wherein the method is performed by at least one processing device comprising a processor coupled to a memory.

2. The computer-implemented method of claim 1, wherein identifying the multiple assets within the enterprise network comprises identifying multiple interne protocol (IP) addresses within the captured network session information.

3. The computer-implemented method of claim 1, wherein the one or more predefined features comprises an operating system of the asset.

4. The computer-implemented method of claim 1, wherein the one or more predefined features comprises a web service used by the asset.

5. The computer-implemented method of claim 1, wherein the one or more predefined features comprises an application used by the asset.

6. The computer-implemented method of claim 1, further comprising:
  recording, for each of the identified assets, the level of criticality, the one or more determined features, and the asset identifier associated therewith to at least one database associated with one or more security analytics systems.

7. The method of claim 4, wherein determining the level of criticality associated with the asset comprises utilizing a user-defined level of criticality associated with the web service used by the asset.

8. The method of claim 1, wherein capturing network session information from an enterprise network comprises capturing (i) geographic information for one or more source IP addresses and one or more destination IP addresses, (ii) session packet count information, and (iii) number of session bytes.

9. A non-transitory processor-readable storage medium having stored therein program code of one or more software programs, wherein the program code when executed by at least one processing device causes the at least one processing device:
  to capture network session information from an enterprise network;
  to identify multiple assets within the enterprise network by processing the captured network session information;
  to determine, for each of the identified assets, one or more predefined features of the asset based at least in part on the processing of the captured network session information, wherein determining one or more predefined features comprises, for each of the identified assets:
    identifying an operating system running on the given identified asset by processing pattern data within one or more transmission control protocol header fields and one or more internet protocol header fields;
    identifying one or more applications running on the given identified asset by processing sequencing data pertaining to one or more hypertext transfer protocol request headers and one or more hypertext transfer protocol response headers, wherein identifying one or more applications running on the given identified asset comprises identifying one or more representational state transfer applications by processing network application layer behavior data;
  to determine, for each of the identified assets, a level of criticality associated with the asset based at least in part on the one or more determined features of the asset, wherein determining the level of criticality associated with the asset comprises utilizing user-defined levels of criticality associated with each of the identified operating systems and each of the identified applications; and
  to output the level of criticality and an identifier of the asset associated therewith to one or more security-related systems, wherein the level of criticality and the asset identifier are used by the one or more security-related systems to take at least one automated action.

10. The non-transitory processor-readable storage medium of claim 9, wherein the one or more predefined features comprises at least one of an operating system of the asset, a web service used by the asset, and an application used by the asset.

11. The non-transitory processor-readable storage medium of claim 9, wherein identifying the multiple assets within the enterprise network comprises identifying multiple IP addresses within the captured network session information.

12. The non-transitory processor-readable storage medium of claim 9, wherein the program code when executed by the at least one processing device further causes the at least one processing device:
  to record, for each of the identified assets, the level of criticality, the one or more determined features, and the asset identifier associated therewith to at least one database associated with one or more security analytics systems.

13. The non-transitory processor-readable storage medium of claim 10, wherein determining the level of criticality associated with the asset comprises utilizing a user-defined level of criticality associated with the web service used by the asset.

14. The non-transitory processor-readable storage medium of claim 9, wherein capturing network session information from an enterprise network comprises capturing (i) geographic information for one or more source IP addresses and one or more destination IP addresses, (ii) session packet count information, and (iii) number of session bytes.

15. An apparatus comprising:
  at least one processing device comprising a processor coupled to a memory;
  the at least one processing device being configured:
    to capture network session information from an enterprise network;
    to identify multiple assets within the enterprise network by processing the captured network session information;
    to determine, for each of the identified assets, one or more predefined features of the asset based at least in part on the processing of the captured network session information, wherein determining one or more predefined features comprises, for each of the identified assets:
      identifying an operating system running on the given identified asset by processing pattern data within one or more transmission control protocol header fields and one or more internet protocol header fields;
      identifying one or more applications running on the given identified asset by processing sequencing data pertaining to one or more hypertext transfer protocol request headers and one or more hypertext transfer protocol response headers, wherein identifying one or more applications running on the given identified asset comprises identifying one or more representational state transfer applications by processing network application layer behavior data;

to determine, for each of the identified assets, a level of criticality associated with the asset based at least in part on the one or more determined features of the asset, wherein determining the level of criticality associated with the asset comprises utilizing user-defined levels of criticality associated with each of the identified operating systems and each of the identified applications; and to output the level of criticality and an identifier of the asset associated therewith to one or more security-related systems, wherein the level of criticality and the asset identifier are used by the one or more security-related systems to take at least one automated action.

16. The apparatus of claim 15, wherein the one or more predefined features comprises at least one of an operating system of the asset, a web service used by the asset, and an application used by the asset.

17. The apparatus of claim 15, wherein identifying the multiple assets within the enterprise network comprises identifying multiple IP addresses within the captured network session information.

18. The apparatus of claim 15, wherein the at least one processing device is further configured:

to record, for each of the identified assets, the level of criticality, the one or more determined features, and the asset identifier associated therewith to at least one database associated with one or more security analytics systems.

19. The apparatus of claim 16, wherein determining the level of criticality associated with the asset comprises utilizing a user-defined level of criticality associated with the web service used by the asset.

20. The apparatus of claim 15, wherein capturing network session information from an enterprise network comprises capturing (i) geographic information for one or more source IP addresses and one or more destination IP addresses, (ii) session packet count information, and (iii) number of session bytes.

* * * * *